United States Patent [19]
Ohashi et al.

[11] Patent Number: 5,515,539
[45] Date of Patent: May 7, 1996

[54] APPARATUS AND METHOD FOR REDUCING POWER CONSUMPTION BY PERIPHERAL DEVICES AFTER DOWNLOADING A PROGRAM THEREFROM

[75] Inventors: Shinichiro Ohashi; Kunihiro Yamada, both of Itami, Japan

[73] Assignee: Mitsubishi Denki Kabushiki Kaisha, Tokyo, Japan

[21] Appl. No.: 257,221

[22] Filed: Jun. 8, 1994

Related U.S. Application Data

[63] Continuation of Ser. No. 978,291, Nov. 18, 1992, abandoned, which is a continuation of Ser. No. 609,956, Nov. 7, 1990, abandoned.

[30] Foreign Application Priority Data

Feb. 6, 1990 [JP] Japan ..................... 2-26609

[51] Int. Cl.$^6$ ................... G06F 1/26; G06F 1/32
[52] U.S. Cl. .................. 395/750; 395/700; 364/DIG. 1; 364/240.2; 364/240.7; 364/273.1; 364/280; 364/280.2
[58] Field of Search ................... 364/707; 365/226–229; 395/275, 325, 425, 750, 775, 830, 284, 309, 310, 429, 700, 800

[56] References Cited

U.S. PATENT DOCUMENTS

| | | | |
|---|---|---|---|
| 3,249,769 | 5/1966 | Mierendorf | 365/229 |
| 3,535,560 | 10/1970 | Cliff | 307/296 |
| 3,636,377 | 1/1972 | Economopoulos et al. | 365/155 |
| 3,641,328 | 2/1972 | Osborne | 365/227 |
| 3,680,061 | 7/1972 | Arbab et al. | 365/227 |
| 3,688,280 | 8/1972 | Ayling et al. | 365/227 |
| 3,795,898 | 3/1974 | Mehta et al. | 365/189.05 |
| 3,803,554 | 4/1974 | Bock et al. | 340/825.07 |
| 3,859,638 | 1/1975 | Hume, Jr. | 365/229 |
| 3,980,935 | 9/1976 | Worst | 365/229 |
| 4,005,395 | 1/1977 | Fosler, Jr. et al. | 365/229 |
| 4,044,330 | 8/1977 | Johnson | 365/189.02 |
| 4,051,326 | 9/1977 | Badagnani et al. | 179/2 DP |
| 4,145,734 | 3/1979 | Bienvenu | 395/183.03 |
| 4,146,802 | 3/1979 | Moench | 307/279 |
| 4,151,611 | 4/1979 | Sugawara et al. | 365/227 |
| 4,158,891 | 6/1979 | Fisher | 365/222 |
| 4,259,594 | 3/1981 | Fox et al. | 307/141 |
| 4,397,001 | 8/1983 | Takemae | 365/189 |
| 4,422,163 | 12/1983 | Oldenkamp | 365/229 |
| 4,456,965 | 6/1984 | Graber et al. | 395/308 |
| 4,545,030 | 10/1985 | Kitchin | 395/550 |
| 4,583,204 | 4/1986 | Takemae et al. | 365/226 |
| 4,590,553 | 5/1986 | Noda | 395/750 |
| 4,615,005 | 9/1986 | Maejima et al. | 395/550 |
| 4,616,346 | 10/1986 | Nakaizumi et al. | 365/229 |
| 4,677,593 | 6/1987 | Davis | 365/189.05 |

(List continued on next page.)

FOREIGN PATENT DOCUMENTS

| | | |
|---|---|---|
| 85106891 | 6/1985 | European Pat. Off. . |
| 2825770 | 6/1978 | Germany . |
| 2243083 | 2/1983 | Japan . |
| 6828683 | 4/1983 | Japan . |

OTHER PUBLICATIONS

"Processor", Nov. 1985, Gijutsu Hyoron-sha, p. 9.

*Primary Examiner*—Thomas C. Lee
*Assistant Examiner*—Lance L. Barry
*Attorney, Agent, or Firm*—Townsend and Townsend and Crew

[57] ABSTRACT

A microcomputer system of the present invention, includes for reducing power consumption therein, an internal memory device in a processor device and a buffer, the buffer further including therein disconnection means for connection and disconnection with and from an external bus and power consumption reduction means for reducing power consumption in peripheral device. Hereby, a program that is executable only within the processor device is stored in the internal memory device, and the peripheral devices are brought into a low power consumption mode and the external bus is made disconnectable upon execution of the program.

8 Claims, 4 Drawing Sheets

U.S. PATENT DOCUMENTS

| | | | |
|---|---|---|---|
| 4,725,982 | 2/1988 | Hara et al. | 365/168 |
| 4,742,452 | 3/1988 | Hirokawa | 395/280 |
| 4,747,041 | 3/1988 | Engel et al. | 395/750 |
| 4,768,145 | 8/1988 | Wheelwright et al. | 395/293 |
| 4,780,843 | 10/1988 | Tietjen | 395/750 |
| 4,794,525 | 12/1988 | Pickert et al. | 395/750 |
| 4,811,294 | 3/1989 | Kobayashi et al. | 365/189.05 |
| 4,841,440 | 6/1989 | Yonezu et al. | 395/750 |
| 4,849,935 | 7/1989 | Miyazawa | 365/189.05 |
| 4,855,902 | 8/1989 | Kozlik et al. | 395/281 |
| 4,872,110 | 10/1989 | Smith et al. | 395/185.08 |
| 4,907,183 | 3/1990 | Tanaka | 364/707 |
| 4,956,681 | 9/1990 | Yokoyama et al. | 357/4 |
| 4,961,140 | 10/1990 | Pechanek et al. | 395/285 |
| 4,975,832 | 12/1990 | Saito et al. | 395/843 |
| 4,975,838 | 12/1990 | Mizuno et al. | 395/200.1 |
| 4,984,211 | 1/1991 | Tran | 365/229 |
| 5,021,950 | 6/1991 | Nishikawa | 395/299 |
| 5,025,387 | 6/1991 | Frane | 364/493 |
| 5,046,052 | 9/1991 | Miyaji et al. | 365/226 |
| 5,113,513 | 5/1992 | Kawai | 395/495 |
| 5,163,124 | 11/1992 | Yabe et al. | 395/750 |
| 5,167,024 | 11/1992 | Smith et al. | 395/375 |
| 5,178,152 | 1/1993 | Ozawa | 128/680 |
| 5,218,704 | 6/1993 | Watts, Jr. et al. | 395/750 |
| 5,237,692 | 8/1993 | Raasch et al. | 395/740 |
| 5,280,589 | 1/1994 | Nakamura | 395/309 |
| 5,339,448 | 8/1994 | Tanaka et al. | 395/775- |

11a, 11b; SWITCHING MEANS 16 1

APPARATUS AND METHOD FOR REDUCING POWER CONSUMPTION BY PERIPHERAL DEVICES AFTER DOWNLOADING A PROGRAM THEREFROM

This is a continuation of application Ser. No. 07/978,291, filed Nov. 18, 1992 and now abandoned; which is a continuation of Ser. No. 07/609,956, filed Nov. 7, 1990 and now abandoned.

BACKGROUND OF THE INVENTION

1. Field of the Invention

The present invention relates to a microcomputer system, and more specifically to that capable of reducing power consumption.

2. Description of the Prior art

Referring to FIG. 6, prior practice of a microcomputer system is exemplified in the form of a block diagram.

As illustrated in the figure, designated at 1 is a microcomputer system such as a personal computer and controls, etc., which comprises a processor unit 5 (hereinafter, referred to as a microprocessing unit (MPU).) composed of a central processing unit (hereinafter, referred to as a CPU.) 2 and of a buffer 4 connected to the CPU2 through an internal bus 3, peripheral equipment composed of a ROM (read only memory) 7 as an external memory device connected to the buffer 4 through an external bus 6, of a RAM (random access memory) 8, and of a data input/output unit (hereinafter, referred to as an I/O unit.) such as a parallel port and a serial port, a block 12 connected to the MPU5, and a watch 13 connected to the external bus and including a counter, the MPU5 and the peripheral equipment 7 to 9 each comprising one-chip LSIS. The CPU2 drives the external bus 6 through the buffer 4 for reading a basic program stored in the ROM7, and writing and reading data and user programs into and out of the RAM8. Additionally, it inputs and outputs data into and from external equipment through the I/O unit 9.

The microcomputer system 1 must read out the programs and data stored in the ROM7 and the RAM8 for executing the programs through the CPU2. For this, an address of the ROM7 or the RAM8 in which such a program has been stored is outputted to the ROM7 or the RAM8 through the internal bus 3, buffer 4, and external bus 6. The ROM7 or RAM8 outputs the program or data stored therein at the foregoing address onto the external bus 6 which is in turn read into the CPU2 through the buffer 4 and the internal bus 3. Further, when the CPU2 executes any processing corresponding to the program or data and outputs data to the peripheral equipment 7 to 9, the data is outputted again through the internal bus 3, buffer 4, and external bus 6.

The prior microcomputer system constructed as described above must access the external bus 6 at all times to which the peripheral equipment 7 to 9 have been connected, consuming more power than required. Further, in order for it to operate as a system, it is needed to input/output data at all times so that it is impossible to turn off a power supply of the peripheral equipment 7 to 9 or reduce voltage as well as to restrict the consumed power of the entire system.

SUMMARY OF THE INVENTION

To solve the problem with the prior art, it is an object of the present invention to provide a microcomputer system capable of reducing power consumption.

To achieve the above object, a microcomputer system according to the present invention comprises a processor unit composed of a central processing unit and a buffer connected to said central processing unit through an internal bus, and peripheral equipment such as an external memory device and a data input/output unit, connected to said buffer through an external bus, said processor unit including an internal memory device connected to said central processing unit through the internal bus, said buffer including connection means for connection or disconnection with or from the external bus and consumed power reduction means controlled by said processor unit for reducing the consumed power of an input power supply of said peripheral equipment.

The above and other objects, features, and advantages of the invention will become more apparent from the following description when taken in conjunction with the accompanying drawings.

DESCRIPTION OF THE PREFERRED EMBODIMENT

Referring now to FIGS. 1 to 5, a microcomputer system of an embodiment of the present invention will be described. The same symbols shall be applied to the identical parts to those shown in FIG. 6, and the description thereof will be omitted.

Figure 1:
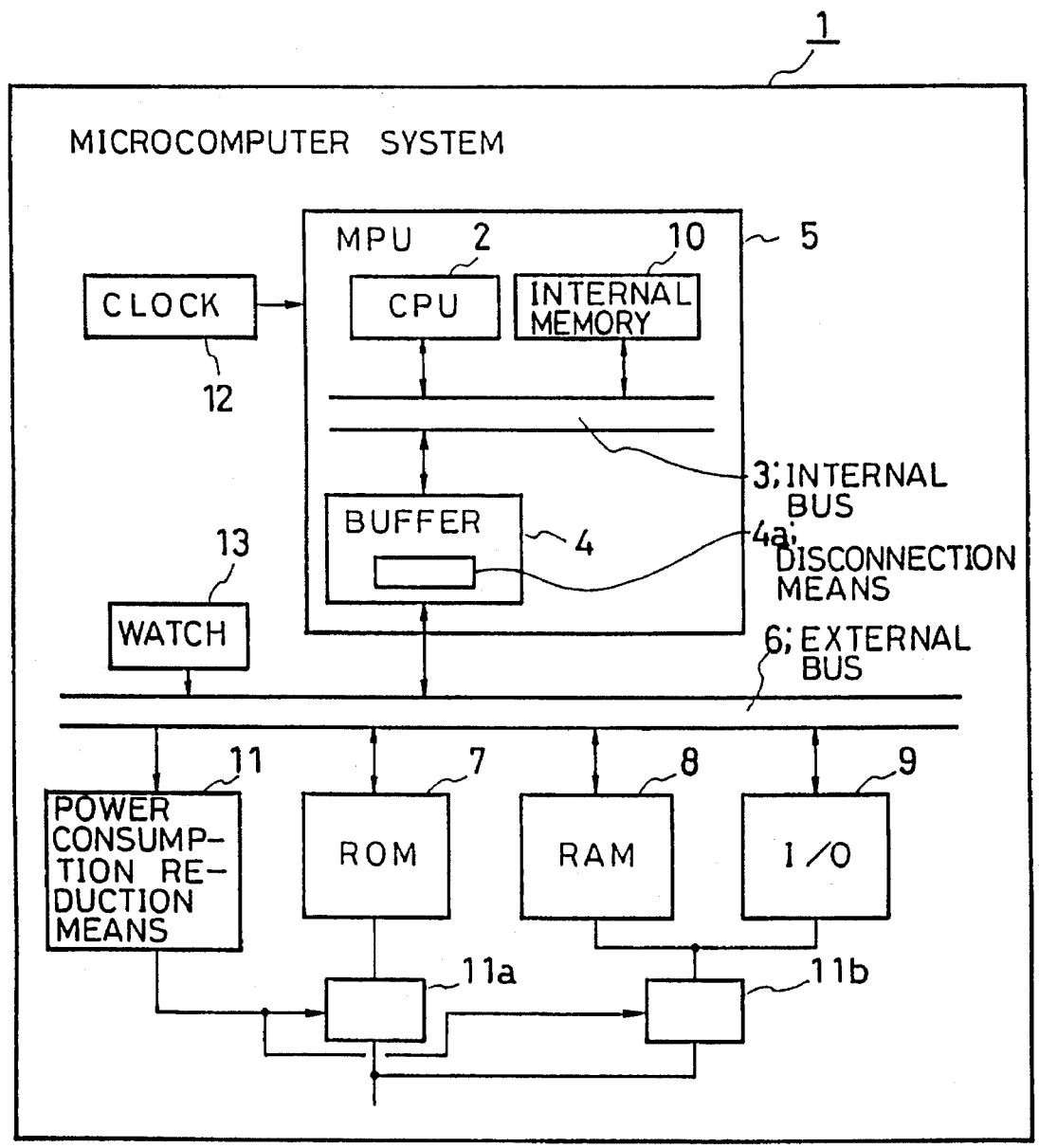
FIG. 1 is a block diagram illustrating a microcomputer system as an embodiment of the present invention.
Figure 2:
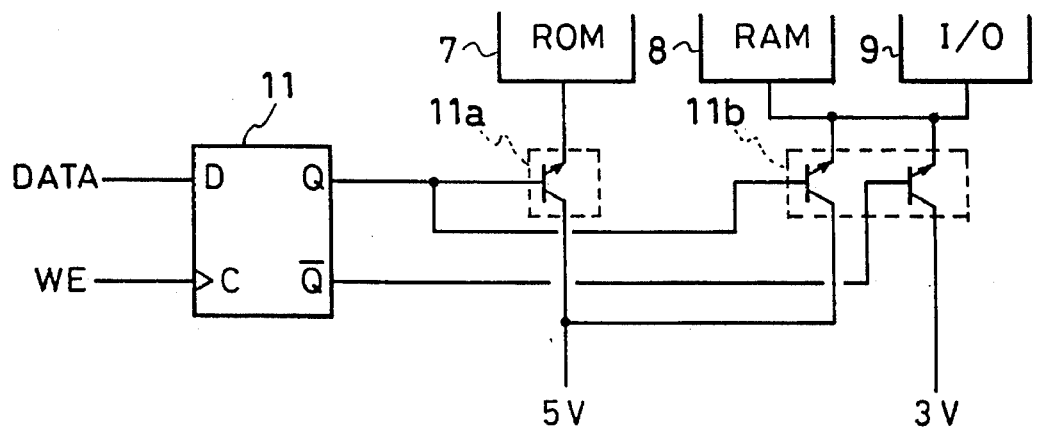
FIGS. 2 and 3 are circuit diagrams of power consumption reduction means, switching means, and a buffer, respectively.
Figure 3:
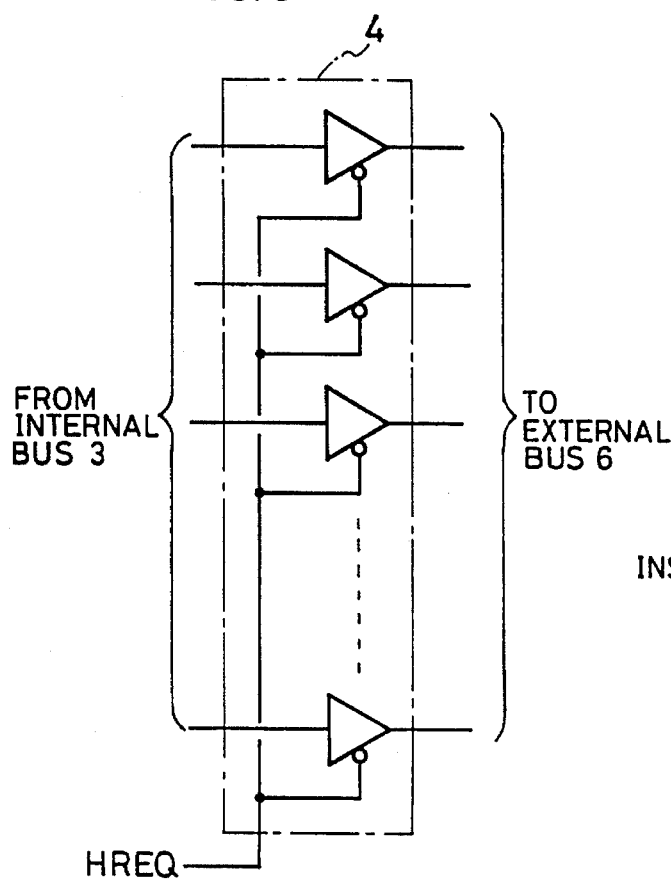

As illustrated in FIG. 1, designated at 10 is an internal RAM as an internal memory device connected to a CPU2 through an internal bus 3 provided in a MPU5, and 11 is power consumption reduction means for controlling switching means 11a, 11b disposed between each peripheral device 7 to 9 and an input power supply, which means is controlled by the CPU2 through the internal bus 3, a buffer 4, and an external bus 6. The power consumption reduction means 11 and the switching means 11a, 11b are comprised respectively of an output port (flip-flop in the present case) and of transistors, as illustrated in FIG. 2. The buffer 4 includes disconnection means 4a for connection and disconnection with the external bus 6 and comprises a plurality of tri-state buffers as illustrated in FIG. 3.

Figure 4:
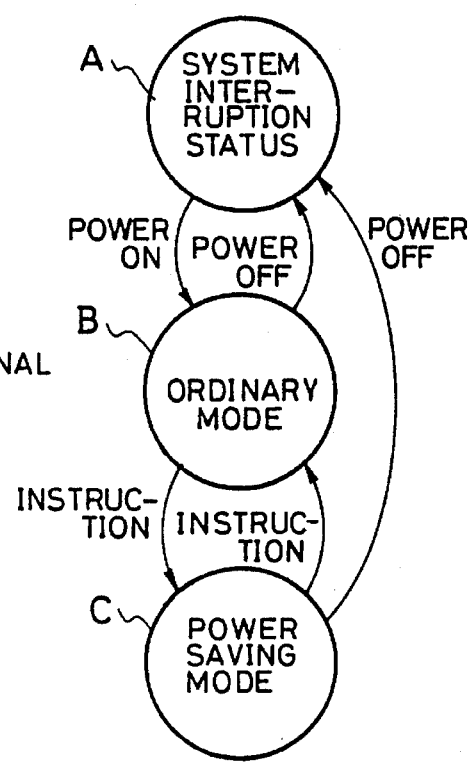
FIGS. 4 and 5 are a view of status transition of the microcomputer system and a flow chart of the same in a power saving mode, respectively.
Figure 5:
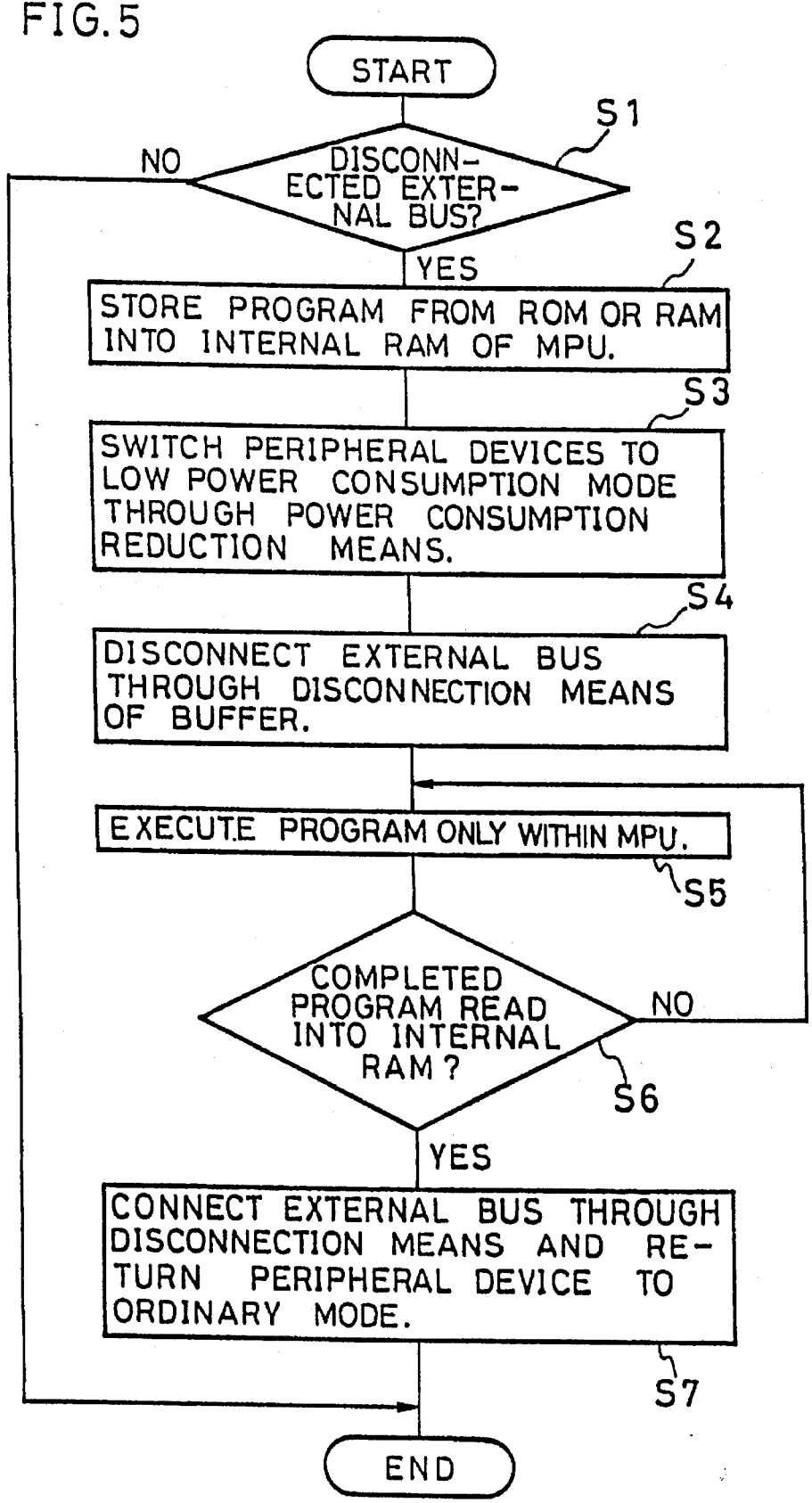
Figure 6:
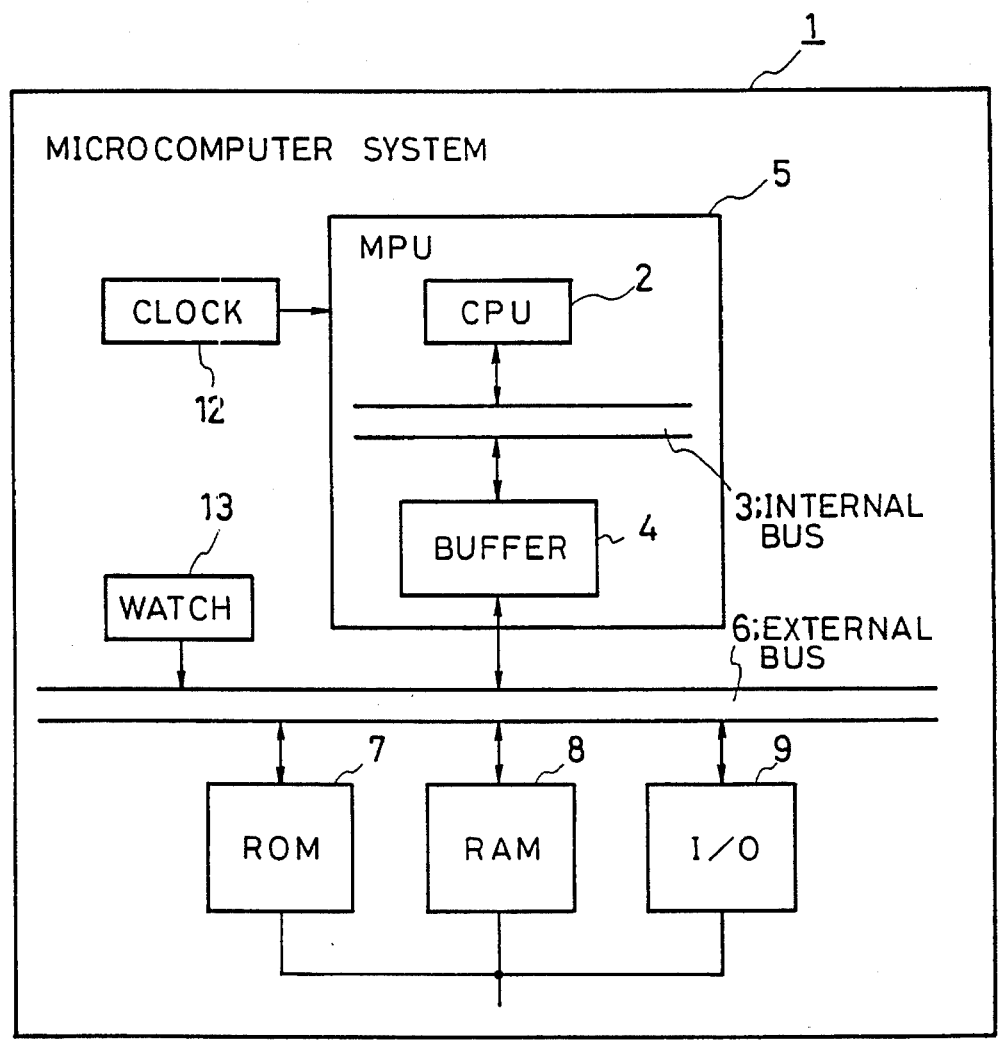
FIG. 6 is a block diagram illustrating a prior microcomputer system.

In the following, operation of the embodiment will be described with reference to FIGS. 4 and 5 in which a status transition of the microcomputer system of the embodiment is illustrated and a flow chart of the same in a power saving mode is depicted. With the power supply turned on from a system interruption status A the operation changes to an ordinary mode B to start the microcomputer system 1 for ordinary processing. Herein, the microcomputer system advances to a power saving mode C by the program or instructions from an external device. In the power saving mode C, in step S1 it is judged whether or not the external bus 6 is at a status to be disconnected, as illustrated in FIG.

5. With such a status of the external bus 6 to be disconnected, in step S2 a program that is to be executed only in the MPU5 is read out from the ROM7 or the through the external bus 6, buffer 4, and internal bus 3, and stored in the internal RAM10. Then, in step S3 the power consumption reduction means 11 is operated by instructions from the CPU2 to switch-the switching means 11a, 11b toward the low power consumption. More specifically, the power supply of the ROM7 is turned off, and the power supplies of the RAM8 and the I/O 9 are reduced in their output voltages to their levels at which data in the RAM8 and the I/O 9 are not erased, for example from 5 V, an ordinary voltage, to 3 V, a low power consumption voltage. In step S4, the disconnection means 4a of the buffer 4 is controlled by the CPU2 to disconnect the MPU5 from the external bus 6. Further, in step 85 the program is executed only in the interior of the MPU5. Hereby, there is required no access to the external bus 6 which severely consumes power, and consumed power with the peripheral devices 7 to 9 is also reduced, so that power consumption of the entire system can be reduced. Additionally, in step S6 it is judged whether or not the program read into the internal RAM10 is completed, and is so, in step S7 the buffer 4 is connected to the external bus 6 and the peripheral devices 7 to 9 are returned to the original status of the operation, i.e., from the power saving mode C to the ordinary mode B shown in FIG. 4. Further, once the power supply is turned off in the power saving mode C, the operation changes to the system interruption status A, and if the power supply is again turned on, the system is started in the ordinary mode B.

Herein, although in the present embodiment the internal RAM10 was provided as the internal memory device, the present invention is not limited thereto. For example, provided the program and data to be executed in the power saving mode C are limited, there may be provided an internal ROM that has previously stored therein those program and data and hence may be permanently stationed those program and data in the MPU5.

According to the microcomputer system of the present invention, as described above, the internal memory device included in the processor device stores therein a program or data. Hereby, the microprocessor system is operable only with the processor device even if the external bus is disconnected through the disconnection means of the buffer. Therefore, power consumption due to the access to the external bus is eliminated by disconnection of the external bus through the buffer, and power consumption in input power supplies of the peripheral devices is reduced by the control of the power consumption reduction means through the processor device prior to disconnection of the external bus. Thus, the power consumption of the entire system can be reduced.

What is claimed is:

1. A microcomputer system having a plurality of peripherals, the system comprising:

a microprocessor unit having an internal memory;

an external bus, coupled to said microprocessor unit and to the plurality of peripherals;

means, coupled to the plurality of peripherals, for reading a program from one of the plurality of peripherals;

means, coupled to said internal memory and to said reading means, for storing said program into said internal memory;

means, coupled between each of the plurality of peripherals and an input power supply for the plurality of peripherals, for switching an input power voltage of each of the plurality of peripherals to a power saving mode responsive to a first switch instruction from said multiprocessing unit and responsive to completion of said storing means storing said program;

means, coupled to said external bus and to said microprocessor unit, for disconnecting said external bus from said microprocessor unit responsive to a disconnect instruction from said multiprocessing unit and responsive to said switching means switching said input power voltage;

means, coupled to said internal memory, for executing said program stored in said internal memory;

means, coupled to said external bus and to said microprocessor unit, for connecting said external bus to said microprocessor unit responsive to a connect instruction from said multiprocessing unit; and means, coupled to the plurality of peripherals and to said input power supply, for switching said input power supply for the plurality of peripherals to an operating power mode responsive to a second switch instruction from said microprocessing unit.

2. A method for reducing input power consumption of peripheral devices in a microcomputer system, comprising the steps of:

reading a program from one of the peripheral devices that is coupled to an external bus of the microcomputer system;

storing said program in an internal memory of a microprocessing unit;

switching the peripheral devices to a low power consumption voltage responsive to a first switch instruction received from said microprocessing unit and responsive to completion of said program storing step;

disconnecting said external bus from said microprocessing unit responsive to a disconnect instruction received from said microprocessing unit received after completion of said low power consumption switching step;

executing said program within said microprocessing unit;

connecting said external bus to said microprocessing unit responsive to a connect instruction from said microprocessing unit; and switching the peripheral devices to an operating power voltage responsive to a second switch instruction from said microprocessing unit.

3. A microcomputer system, comprising:

a microprocessing unit including a central processing unit, an internal memory, and a buffer wherein said central processing unit is coupled to said internal memory and to said buffer by an internal bus and said buffer includes means, responsive to instructions from said central processing unit, for disconnecting and connecting an external bus;

an external bus coupled to said buffer;

a first peripheral device, coupled to said external bus, for interfacing to said microprocessing unit, said first peripheral device operational when supplied with a first voltage level and non-operational when supplied with a second voltage level less than said first voltage level;

switching means, coupled to said first peripheral device and to a power supply, for providing said first peripheral device with said first voltage level in response to a first signal and with said second voltage level responsive to a second signal; and power consumption reduction means, coupled to said external bus and responsive to instructions from said central processing unit, for asserting said first signal and said second signal wherein said second signal is asserted after data is read into said buffer over said external bus and wherein said means for connecting and disconnecting disconnects said buffer from said external bus after said second signal is asserted.

4. The microcomputer system of claim 3 wherein said first peripheral device is a ROM and said second voltage level is zero volts.

5. The microcomputer system of claim 3 further comprising a second peripheral device coupled to said external bus, said second peripheral device operational when supplied with a third voltage level and non-operational when supplied with a fourth voltage level less than said third voltage level, and wherein:

said switching means, coupled to said second peripheral device, provides said second peripheral device with said third voltage level in response to said first signal and said fourth voltage level in response to said second voltage level.

6. The microcomputer system of claim 5 wherein said first peripheral device is a ROM and said second voltage level is zero volts.

7. The microcomputer system of claim 6 wherein said second peripheral device is a RAM and said fourth voltage level is greater than zero volts and sufficient to inhibit volatility of stored information.

8. The microcomputer system of claim 7 wherein said first voltage level and said third voltage level are equal.

* * * * *

UNITED STATES PATENT AND TRADEMARK OFFICE
CERTIFICATE OF CORRECTION

PATENT NO. : 5,515,539
DATED : May 7, 1996
INVENTOR(S) : Shinichiro Ohashi, et al It is certified that error appears in the above-identified patent and that said Letters Patent is hereby corrected as shown below:

Col. 4, Line 3, Change "multiprocessing unit" to --microprocessor unit--

Col. 4, Line 8, Change "multiprocessing unit" to --microprocessor unit--

Col. 4, Line 17, Change "multiprocessing unit" to --microprocessor unit--

Col. 4, Line 23, Change "microprocessing unit" to --microprocessor unit--

Col. 4, Line 30, Change "microprocessing unit" to --microprocessor unit--

Col. 4, Line 34, Change "microprocessing unit" to --microprocessor unit--

Col. 4, Line 36, Change "microprocessing unit" to --microprocessor unit--

Col. 4, Line 38, Change "microprocessing unit" to --microprocessor unit--

Col. 4, Line 41, Change "microprocessing unit" to --microprocessor unit--

Col. 4, Line 42, Change "microprocessing unit" to --microprocessor unit--

Col. 4, Line 43, Change "microprocessing unit" to --microprocessor unit--

UNITED STATES PATENT AND TRADEMARK OFFICE
CERTIFICATE OF CORRECTION

PATENT NO. : 5,515,539
DATED : May 7, 1996
INVENTOR(S) : Shinichiro Ohashi, et al It is certified that error appears in the above-identified patent and that said Letters Patent is hereby corrected as shown below:

Col. 4, Line 47, Change "microprocessing unit" to --microprocessor unit--

Col. 4, Line 49, Change "microprocessing unit" to --microprocessor unit--

Col. 4, Line 59, Change "microprocessing unit" to --microprocessor unit--

Signed and Sealed this

Ninth Day of December, 1997

*Attest:*

BRUCE LEHMAN

*Attesting Officer*     *Commissioner of Patents and Trademarks*